United States Patent
Viswanathan

(10) Patent No.: US 12,453,597 B2
(45) Date of Patent: Oct. 28, 2025

(54) FOCAL ABLATION DEVICES WITH FOLDABLE ELEMENTS, AND SYSTEMS AND METHODS THEREOF

(71) Applicant: Boston Scientific Scimed, Inc., Maple Grove, MN (US)

(72) Inventor: Raju Viswanathan, Mountain View, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 670 days.

(21) Appl. No.: 17/853,255

(22) Filed: Jun. 29, 2022

(65) Prior Publication Data

US 2023/0000548 A1  Jan. 5, 2023

Related U.S. Application Data

(60) Provisional application No. 63/218,154, filed on Jul. 2, 2021.

(51) Int. Cl.
*A61B 18/00* (2006.01)
*A61B 18/14* (2006.01)

(52) U.S. Cl.
CPC .............. *A61B 18/1492* (2013.01); *A61B 2018/00267* (2013.01); *A61B 2018/00351* (2013.01); *A61B 2018/00577* (2013.01); *A61B 2018/1467* (2013.01)

(58) Field of Classification Search
None
See application file for complete search history.

(56) References Cited

U.S. PATENT DOCUMENTS

| | | | | |
|---|---|---|---|---|
| 6,258,087 B1 * | 7/2001 | Edwards | ............ | A61B 18/1206 606/41 |
| 9,314,208 B1 * | 4/2016 | Altmann | .............. | A61B 5/6858 |
| 2009/0299355 A1 * | 12/2009 | Bencini | .................. | A61B 18/02 606/21 |
| 2012/0029509 A1 * | 2/2012 | Smith | ................ | A61B 18/1492 606/41 |
| 2016/0302858 A1 | 10/2016 | Bencini et al. | | |
| 2016/0331459 A1 * | 11/2016 | Townley | ................ | A61N 5/022 |
| 2019/0021620 A1 | 1/2019 | Olson et al. | | |
| 2019/0030328 A1 | 1/2019 | Stewart et al. | | |
| 2019/0110750 A1 | 4/2019 | Dahlen et al. | | |

\* cited by examiner

*Primary Examiner* — Linda C Dvorak
*Assistant Examiner* — Nicholas S Borsch
(74) *Attorney, Agent, or Firm* — Nelson Mullins Riley & Scarborough LLP

(57) ABSTRACT

An endocardial catheter comprises an outer shaft having an outer shaft lumen, an inner shaft slidably disposed within the outer shaft lumen, a spline assembly comprising a plurality of flexible splines each having a spline proximal end attached to a distal end of the outer shaft, an opposite spline distal end attached to a distal end of the inner shaft, and an electrode, wherein the plurality of splines collectively define an interior space of the spline assembly, and a foldable membrane disposed within the interior space of the spline assembly, the foldable membrane having an outer edge portion attached to one or more of the splines. The foldable membrane comprises an electrically insulative material.

17 Claims, 13 Drawing Sheets

FOCAL ABLATION DEVICES WITH FOLDABLE ELEMENTS, AND SYSTEMS AND METHODS THEREOF

CROSS REFERENCE TO RELATED APPLICATION

This application claims priority to U.S. Provisional Application No. 63/218,154, filed Jul. 2, 2021, which is herein incorporated by reference in its entirety.

TECHNICAL FIELD

The embodiments described herein relate generally to systems, devices, and methods for therapeutic electrical energy delivery and more particularly to systems, devices, and methods for application of pulsed electric fields to ablate tissue by irreversible electroporation using focal ablation devices.

BACKGROUND

Pulsed electric field ablation using application of high voltage pulses has been demonstrated to be suitable for the rapid and effective ablation of cardiac tissue as well as other target anatomy. Pulsed electric field energy delivery utilizes brief pulses of high voltage that generate locally high electric fields that can drive the breakdown of cell membranes and result in cell death, a process also referred to as irreversible electroporation. For example, in the cardiac context, an endocardial focal ablation catheter can be used to deliver pulsed field ablation via irreversible electroporation to cardiac tissue.

In the presence of a relatively more electrically conductive fluid medium (for example, such as blood), the high voltage pulses of pulsed field ablation can result in current flows between the electrodes of an ablation device, where a significant proportion of the net current flows through the fluid medium rather than through tissue. This can result in lesion characteristics that can be suboptimal for some applications, such as, for example, generating deeper lesions in thicker tissue (e.g., ventricular tissue). It therefore can be desirable to have ablation device designs that can improve the generation of deep lesions in tissue.

SUMMARY

In Example 1, an endocardial catheter comprising an outer shaft, an inner shaft, a spline assembly, and a foldable membrane. The outer shaft has a proximal end and an opposite distal end, and an outer shaft lumen extending through the proximal and distal ends. The inner shaft is slidably disposed within the outer shaft lumen, the inner shaft having a proximal portion and an opposite distal end, the inner shaft sized to extend beyond the distal end of the outer shaft. The spline assembly comprises a plurality of flexible splines each having a spline proximal end attached to the distal end of the outer shaft, an opposite spline distal end attached to the distal end of the inner shaft, and a plurality of electrodes, wherein the plurality of splines collectively define an interior space of the spline assembly. The foldable membrane is disposed within the interior space of the spline assembly, the foldable membrane having an outer edge portion attached to one or more of the splines.

In Example 2, the endocardial catheter of Example 1, wherein the foldable membrane is formed of an electrically insulative material.

In Example 3, the endocardial catheter of Example 2, wherein the spline assembly can be transitioned between an undeployed configuration and a deployed configuration by causing relative axial movement between the inner shaft and the outer shaft.

In Example 4, the endocardial catheter of Example 3, wherein the spline assembly has a minimum diameter in the undeployed configuration, and has a maximum diameter in the fully deployed configuration.

In Example 5, the endocardial catheter of Example 4, wherein the plurality of electrodes on each spline includes a proximal spline electrode and a distal spline electrode, and wherein the proximal spline electrodes of the plurality of splines collectively define a proximal spline electrode set, and wherein the distal spline electrodes of the plurality of splines collectively define a distal spline electrode set.

In Example 6, the endocardial catheter of Example 5, wherein the outer edge portion of the foldable membrane is attached to the one or more splines at a longitudinal location thereof corresponding to the maximum diameter of the spline assembly in the fully deployed configuration.

In Example 7, the endocardial catheter of Example 5 wherein the outer edge portion of the foldable membrane is attached to the one or more splines at a longitudinal location between the proximal spline electrode and the distal spline electrode disposed on each of the one or more splines.

In Example 8, the endocardial catheter of Example 7, wherein each of the splines has a curved shape when the spline assembly is in the deployed configuration, and wherein the foldable membrane is attached to the one or more splines at a point of maximum curvature thereof, and wherein the point of maximum curvature is located closer to the distal end of each spline than to the proximal end thereof.

In Example 9, the endocardial catheter of Example 5, wherein the foldable membrane assumes a circular shape when the spline assembly is in the deployed configuration.

In Example 10, the endocardial catheter of Example 9, wherein the outer edge portion of the foldable membrane has a plurality of arcuate notches at locations corresponding to points of attachment of the foldable membrane to the one or more splines.

In Example 11, the endocardial catheter of Example 5, wherein the outer edge portion of the foldable membrane has a plurality of concave portions when the spline assembly is in the deployed configuration.

In Example 12, the endocardial catheter of Example 5, wherein the foldable membrane includes a plurality of folds, wherein a respective one of the folds is located between adjacent splines of the spline assembly.

In Example 13, the endocardial catheter of Example 5, wherein the foldable membrane includes an aperture, and wherein the inner shaft extends through the aperture.

In Example 14, the endocardial catheter of Example 13, wherein the inner shaft includes a hub, and an inner edge of the aperture of the foldable membrane is attached to the hub.

In Example 15, the endocardial catheter of Example 14, further comprising a plurality of radial struts coupled to the foldable membrane configured to facilitate folding and unfolding of the foldable membrane as the spline assembly transitions between the deployed and undeployed configuration.

In Example 16, a system for focal pulsed field ablation of cardiac tissue, the system comprising an endocardial catheter and a signal generator. The endocardial catheter comprises an outer shaft, an inner shaft, a spline assembly, and a foldable membrane. The outer shaft has a proximal end and an opposite distal end, and an outer shaft lumen extending through the proximal and distal ends. The inner shaft is slidably disposed within the outer shaft lumen, the inner shaft having a proximal portion and an opposite distal end, the inner shaft sized to extend beyond the distal end of the outer shaft. The spline assembly comprises a plurality of flexible splines each having a spline proximal end attached to the distal end of the outer shaft, an opposite spline distal end attached to the distal end of the inner shaft, and a plurality of electrodes, wherein the plurality of splines collectively define an interior space of the spline assembly. The foldable membrane is disposed within the interior space of the spline assembly, the foldable membrane having an outer edge portion attached to one or more of the splines. The signal generator is configured to generate pulsed waveforms and deliver the pulsed waveforms to the plurality of electrodes.

In Example 17, the system of Example 16, wherein the plurality of electrodes on each spline includes a proximal spline electrode and a distal spline electrode, and wherein the proximal spline electrodes of the plurality of splines collectively define a proximal spline electrode set, and wherein the distal spline electrodes of the plurality of splines collectively define a distal spline electrode set.

In Example 18, the system of Example 16, wherein the outer edge portion of the foldable membrane is attached to the one or more splines at a longitudinal location thereof corresponding to a maximum diameter of the spline assembly in a fully deployed configuration.

In Example 19, an endocardial catheter comprising an outer shaft, an inner shaft, an expandable and collapsible spline assembly, and a foldable membrane. The outer shaft has an outer shaft distal end, and the inner shaft is disposed within the outer shaft and including an inner shaft distal end. The expandable and collapsible spline assembly includes a plurality of splines each connected to the outer shaft distal end and the inner shaft distal end, each spline further including a plurality of electrodes including a proximal electrode and a distal electrode. The foldable membrane comprises a polymeric material attached to one or more of the plurality of splines at an attachment location between the proximal and distal electrode disposed thereon.

In Example 20, the endocardial catheter of Example 19, wherein the attachment location is corresponds to a maximum diameter of the spline assembly in a fully deployed configuration.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
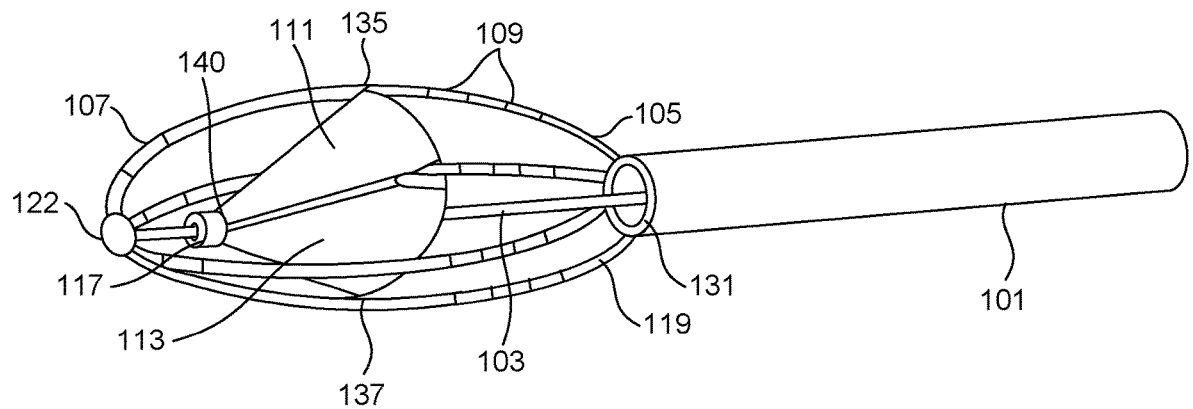
FIG. 1 schematically illustrates a perspective view an ablation device in an undeployed configuration, according to embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Described herein are focal ablation devices and related systems and methods for generating pulsed electric fields that can be delivered to tissue (e.g., cardiac tissue) for ablation. Such delivery of pulsed electric fields for ablation can also be referred to herein as pulsed field ablation or PFA. In some embodiments, the focal ablation devices described herein can be used to treat cardiac arrhythmias in atrial or ventricular cardiac tissue.

Pulsed electric field energy delivery utilizes brief pulses of high voltage that generate locally high electric fields that can drive the breakdown of cell membranes and result in cell death, a process also referred to as irreversible electroporation. Examples of endocardial focal catheters configured for the delivery of PFA include multi-electrode basket constructions with deployable splines, such as those described in: (1) U.S. patent application Ser. No. 15/874,721, filed Jan. 18, 2018, titled "SYSTEMS, DEVICES, AND METHODS FOR FOCAL ABLATION," issued as U.S. Pat. No. 10,130,423; (2) International Application No. PCT/US19/14226, filed Jan. 18, 2019, titled "SYSTEMS, DEVICES, AND METHODS FOR FOCAL ABLATION," published as International Patent Application Publication No. WO 2019/143960; and (3) International Application No. PCT/US20/26682, filed Apr. 3, 2020, titled "SYSTEMS, DEVICES, AND METHODS FOR FOCAL ABLATION," published as International Patent Application Publication No. WO 2020/206328, the contents of which are hereby incorporated by reference in its entirety.

In some embodiments, a signal generator can be used to generate waveforms for pulsed field ablation. The signal generator can be coupled to the ablation devices described herein and can be generate waveforms that are suitable for use with such devices. Such pulsed waveforms can be designed to enhance one or more of the safety, efficiency, and effectiveness of energy delivery to tissue by reducing the electric field threshold associated with irreversible electroporation, thus yielding more effective ablative lesions with a reduction (e.g., minimization) in total energy delivered. In some embodiments, the voltage pulse waveforms disclosed herein may be hierarchical and have a nested structure. For example, the pulse waveform may include hierarchical groupings of pulses having associated timescales. Examples of suitable pulse waveforms including a plurality of levels of a hierarchy are disclosed in International Application Serial No. PCT/US2016/057664, filed on Oct. 19, 2016, titled "SYSTEMS, APPARATUSES AND METHODS FOR DELIVERY OF ABLATIVE ENERGY TO TISSUE," and International Application Serial No. PCT/US2019/031135, filed May 7, 2019, titled "SYSTEMS, APPARATUSES AND METHODS FOR DELIVERY OF ABLATIVE ENERGY TO TISSUE," the contents of each of which are hereby incorporated by reference in their entirety.

In endocardial clinical applications of pulsed field ablation, it can be desirable to generate focal lesions where a local region of tissue is ablated. In some instances, such a lesion can be transmural, e.g., the lesion extends across an entire depth of a tissue wall. In thicker cardiac tissue, for example, as is common in the left ventricle, the tissue thickness can be significantly thick, e.g., about 8 mm to about 10 mm, or more. Accordingly, in applications such as for treatment of ventricular arrhythmias such as ventricular tachycardia (VT), it can be desirable to be able to create lesions with greater depth. Systems, devices, and methods described herein can be configured to deliver pulsed field ablation to tissue for generation of deeper lesions.

Systems

This disclosure describes apparatus and device embodiments for pulsed field ablation delivery to generate deep lesions in cardiac tissue and associated methods of use. In some embodiments, the device may be a catheter including an outer shaft and an inner shaft. The inner shaft may be configured to translate (e.g., extend) beyond a distal end of the outer shaft. The device may include a spline assembly comprising a plurality of splines coupled (e.g., attached) between a distal end of the outer shaft and a distal end of the inner shaft. For example, a proximal end of each spline can be attached to a distal end of the outer shaft, and a distal end of each spline can be attached to a distal end of the inner shaft. In some embodiments, a length of each spline can be longer than a maximum distance by which a distal end of the inner shaft extends beyond a distal end of the outer shaft. Thus, the splines can collectively form a basket-like shape. In some embodiments, the inner shaft can be translated (e.g., retracted) relative to the outer shaft via a handle.

In some embodiments, the device may be configured to transition between an undeployed configuration and a deployed configuration, including a plurality of semi-deployed (e.g., partial deployment) configurations between the undeployed configuration and the deployed configuration. For example, in an undeployed configuration, the inner shaft can be extended beyond a distal end of the outer shaft such that the basket-like shape formed by the splines has a minimal diameter or cross-section. When the inner shaft is retracted, the splines can deploy (e.g., via buckling or outward movement) into a basket-like structure with a larger cross-section (e.g., larger cross-sectional area with a larger maximum diameter than in the undeployed configuration). In some embodiments, a range of deployments from undeployed to full deployment are generally available, with the basket-like shape attaining its widest cross-section when the device is fully deployed.

In some embodiments, each spline may include a plurality of electrodes, with a set of one or more distal electrodes and a set of two or more proximal electrodes being located proximal to the set of distal electrodes. For ablation delivery of a pulsed field ablation waveform, various subsets of the distal electrodes can be polarized with a first electrical polarity while various subsets of the proximal electrodes can be polarized with a second electrical polarity opposite the first electrical polarity. The applied waveform can be either monophasic (e.g., single relative polarity) or biphasic (e.g., alternating relative polarities). Example waveforms for pulsed field ablation are described in International Application Serial Nos. PCT/US2016/057664 and PCT/US2019/031135, each of which are incorporated above by reference.

In some embodiments, a membrane comprising insulating material can be disposed generally in a middle or central portion of the splines. To facilitate attachment of the membrane to one or more of the splines, the membrane may define one or more recesses (e.g., cut-outs) along an outer edge of the membrane configured to attach to one or more of the splines. In some embodiments, an inner portion of the membrane may define an aperture (e.g., hole) configured to receive an inner shaft. In some embodiments, the membrane may be coupled to one or more splines between a set of distal electrodes and a set of proximal electrodes of one or more of the splines.

In some embodiments, a one-sided surface area of the membrane can be larger than a cross-sectional area formed by the splines in the undeployed configuration. In some embodiments, in the undeployed configuration, the membrane may define one or more edges (e.g., fold lines) where the membrane can naturally fold between adjacent splines. In the deployed configuration where the basket is expanded, the membrane can open (e.g., unfold) and assumes a relatively taut or flat configuration between the splines. In some embodiments, the membrane may have a surface area about 50% or more of the largest cross-sectional area formed by the splines in the deployed configuration.

In some embodiments, the inner shaft may include a hub (e.g., protrusion, stop, guide, rail, fastener) configured to couple to the edge of the aperture of the membrane to facilitate deployment of the membrane. For example, the hub may be generally fixed to inner shaft or allowed to translate over a predetermined tolerance (e.g., limited or bounded by stops or nubs along the inner shaft) to provide structural support to the membrane.

In some embodiments, the membrane including insulation disposed between a distal set of spline electrodes and a proximal set of spline electrodes may be configured to redirect electric field lines generated by the device such that an electric field intensity distal to the distal electrodes is increased, thereby generating a relatively deeper lesion than would be generated in the absence of the membrane. The membrane may be configured to facilitate a deeper lesion from the undeployed configuration to a fully deployed configuration, and any partially deployed configuration therebetween. In some embodiments, devices having a membrane as described herein may generate lesions having a depth deeper by about 20% or more than a device not having the membrane.

Figure 11:
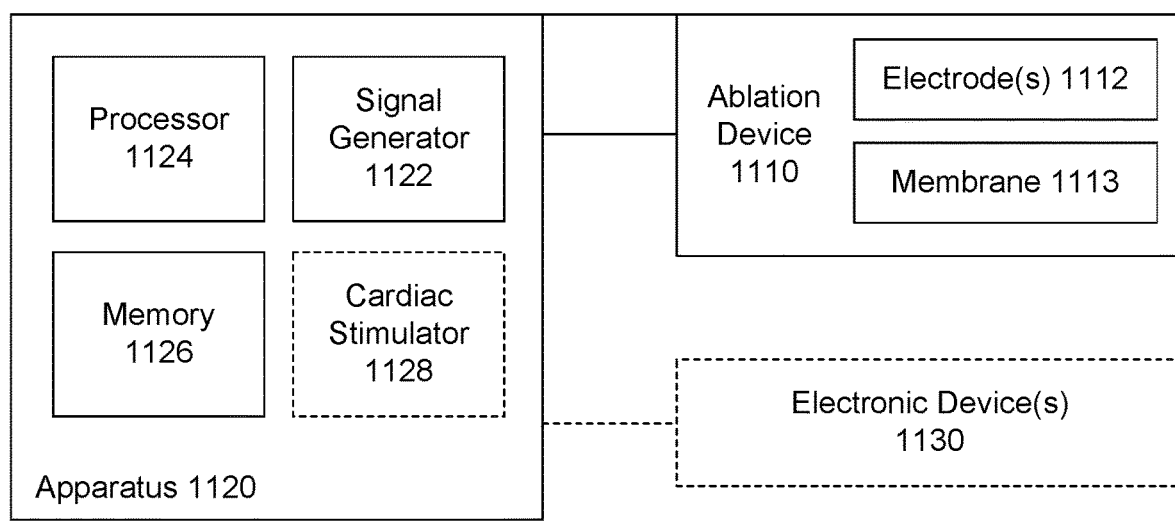
FIG. 11 schematically illustrates an ablation system, according to embodiments.

Generally, the systems and devices described herein include one or more catheters configured to ablate tissue in a left atrial chamber of a heart. FIG. 11 illustrates an ablation system (1100) configured to deliver voltage pulse waveforms. The system (1100) may include an apparatus (1120) including a signal generator (1122), processor (1124), and memory (1126), and optionally a cardiac stimulator (1128).

The apparatus (1120) may be coupled to an ablation device (1110) and optionally to an electronic device (1130).

The signal generator (1122) may be configured to generate pulse waveforms for irreversible electroporation of tissue, such as, for example, pulmonary vein ostia or other cardiac locations. For example, the signal generator (1122) may be a voltage pulse waveform generator and deliver a pulse waveform to the ablation device (1110). The processor (1124) may incorporate data received from memory (1126) to determine the parameters (e.g., amplitude, width, duty cycle, etc.) of the pulse waveform to be generated by the signal generator (1122). The memory (1126) may further store instructions to cause the signal generator (1122) to execute modules, processes and/or functions associated with the system (1100), such as pulse waveform generation, mapping, sensing, and/or cardiac pacing synchronization. For example, the memory (1126) may be configured to store pulse waveform and/or heart pacing data for pulse waveform generation and/or cardiac pacing, respectively.

In some embodiments, the ablation device (1110) may include a catheter configured to receive and/or deliver the pulse waveforms described in more detail herein. For example, the ablation device (1110) may be introduced into an endocardial space of the heart and positioned to position one or more electrodes (1112) and membrane (1113) near tissue, and then deliver the pulse waveforms to ablate the tissue. The ablation device (1110) may include one or more electrodes (1112), which may, in some embodiments, contain at least one set of independently addressable electrodes. Each electrode may include an insulated electrical lead configured to sustain a voltage potential of at least about 700 V without dielectric breakdown of its corresponding insulation. In some embodiments, the insulation on each of the electrical leads may sustain an electrical potential difference of between about 200 V to about 2,500 V across its thickness without dielectric breakdown. For example, the electrodes (1112) may be grouped into one or more anode-cathode subsets such as, for example, a subset including one anode and one cathode, a subset including two anodes and two cathodes, a subset including two anodes and one cathode, a subset including one anode and two cathodes, a subset including three anodes and one cathode, a subset including three anodes and two cathodes, and/or the like. In some embodiments, the membrane (1113) may be coupled to the splines of the electrode(s) (1112) and configured to shape and/or direct the electric field generated by the ablation device (1110).

Optionally, one or more electronic devices (1130) may be coupled to the apparatus (1120) to provide additional functionality to the system (1100). For example, the electronic device (1130) may be configured to perform one or more of sensing, mapping, localization, protection, pacing, and the like. In some embodiments, the electronic device (1130) may include one or more of a sensor, mapping catheter, protection device, and pacing device. For example, the electronic device (1130) may be a pacing device suitably coupled to the patient (not shown) and configured to receive a heart pacing signal generated by the cardiac stimulator (1128) of the apparatus (1120) for cardiac stimulation. An indication of the pacing signal may be transmitted by the cardiac stimulator (1128) to the signal generator (1122). Based on the pacing signal, an ablation voltage pulse waveform may be selected, computed, and/or otherwise identified by the processor (1124) and generated by the signal generator (1122). In some embodiments, the signal generator (1122) can be configured to generate the pulse waveform in synchronization with the indication of the pacing signal (e.g., within a common refractory window). For example, in some embodiments, the common refractory window may start substantially immediately following a ventricular pacing signal (or after a very small delay) and last for a duration of about 250 ms or less thereafter. In such embodiments, an entire pulse waveform may be delivered within this duration. In alternate embodiments, the ablation waveform can be delivered without a pacing signal, e.g., asynchronously delivered.

The processor (1124) may be any suitable processing device configured to run and/or execute a set of instructions or code. The processor may be, for example, a general purpose processor, a Field Programmable Gate Array (FPGA), an Application Specific Integrated Circuit (ASIC), a Digital Signal Processor (DSP), and/or the like. The processor may be configured to run and/or execute application processes and/or other modules, processes and/or functions associated with the system and/or a network associated therewith (not shown). The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and/or the like.

The memory (1126) may include a database (not shown) and may be, for example, a random access memory (RAM), a memory buffer, a hard drive, an erasable programmable read-only memory (EPROM), an electrically erasable read-only memory (EEPROM), a read-only memory (ROM), a Field Programmable Gate Array (FPGA), Flash memory, etc. The memory (1126) may store instructions to cause the processor (1124) to execute modules, processes and/or functions associated with the system (1100), such as pulse waveform generation, mapping, localization, and/or cardiac pacing.

The system (1100) may be in communication with other devices (not shown) via, for example, one or more networks, each of which may be any type of network. A wireless network may refer to any type of digital network that is not connected by cables of any kind. However, a wireless network may connect to a wireline network in order to interface with the Internet, other carrier voice and data networks, business networks, and personal networks. A wireline network is typically carried over copper twisted pair, coaxial cable or fiber optic cables. There are many different types of wireline networks including, wide area networks (WAN), metropolitan area networks (MAN), local area networks (LAN), campus area networks (CAN), global area networks (GAN), like the Internet, and virtual private networks (VPN). Hereinafter, network refers to any combination of combined wireless, wireline, public and private data networks that are typically interconnected through the Internet, to provide a unified networking and information access solution.

FIG. 1 schematically illustrates a perspective view of a device (100) (e.g., endocardial catheter, ablation device) in an undeployed configuration, including a plurality of splines having a basket-like shape and a foldable membrane defining a set of folds. Device (100) can be an ablation device, such as, for example, ablation device (1100) described with respect to FIG. 11. In some embodiments, the catheter (100) may have an outer shaft (101) defining an inner lumen and an inner shaft (103) disposed therein. The inner shaft (103) may be configured to extend beyond a distal end (131) of the outer shaft (101). A plurality of splines (105, 119) may be attached to an inner surface of the distal end (131) of the outer shaft (101) at their proximal ends. The distal ends of the plurality of splines (105, 119) may be attached at device tip (122) and a distal end of the inner shaft (103). In some embodiments, a length of each spline (105, 119) may be longer than a maximum distance by which the distal end of the inner shaft (103) can extend beyond the distal end of the outer shaft (101). Thus, the plurality of splines may collectively form a basket-like structure. In some embodiments, the inner shaft (103) can be translated (e.g., retracted, extended) relative to the outer shaft (101) or the outer shaft (101) can be translated relative to the inner shaft (103) via a handle mechanism (not shown).

In some embodiments, each spline of the plurality of splines has a set of distal electrodes and a set of proximal electrodes. For example, spline (105) may have a distal electrode (107) and two proximal electrodes (109). In some embodiments, a flexible element such as a foldable membrane (111) (e.g., deployable membrane) may be attached along its circumference (e.g., outer edge) to one or more of the splines. For example, membrane (111) may be attached to splines (105, 119) at locations (135, 137) respectively. An inner portion of the membrane (111) may define an aperture through which the inner shaft (103) is received (e.g., passes through). Optionally, the inner shaft may comprise a hub (117) to which the inner portion (140) of the membrane may be attached as shown in FIG. 1. The hub (117) can, for example, be made of a polymeric material, such as, for example, Pebax or silicone, while the membrane (111) can include a polymeric material, such as, for example, polyurethane, Pebax, silicone, etc. In an undeployed configuration, membrane (111) may have folds (113) located between adjacent splines, where the membrane (111) folds inward relative to the splines (105, 119). In some embodiments, the membrane (111) may have patterns or cuts that are configured to define lines along which the membrane (111) folds.

In the undeployed configuration shown in FIG. 1, the inner shaft (103) is fully extended beyond the distal end (131) of the outer shaft (101) and the basket structure formed by the splines has a minimal diameter or cross-section. In some embodiments, the electrodes on the spline can be made of any of a variety of biocompatible electrical conductors such as stainless steel, gold, platinum-iridium alloys, etc. In some embodiments, the electrodes can range in length from between about 0.5 mm to about 7 mm, including any sub-ranges and values in-between. The spacing between nearest edges of adjacent proximal electrodes on a given spline (when there are multiple proximal electrodes on a given spline), or between nearest edges of adjacent distal electrodes on a given spline (when there are multiple distal electrodes on a given spline) can range from between about 0.5 mm to about 5 mm, including any sub-ranges and values in-between.

In some embodiments, the arc length of a spline can range from between about 8 mm to about 55 mm, including any sub-ranges and values in-between. In some embodiments, the mean diameter of each spline can range from about 0.5 mm to about 3 mm, including any sub-ranges and values in-between. In embodiments, the cross-section of a spline can be approximately elliptical or oval, or the spline cross-section can be circular. In some embodiments, the number of splines of the device can range from about 3 to about 16 splines. In some embodiments, the outer shaft (101) of the catheter can range in outside diameter from about 5 F or 5 French (or 5/3 mm) to about 18 F (or 6 mm).

Figure 2:
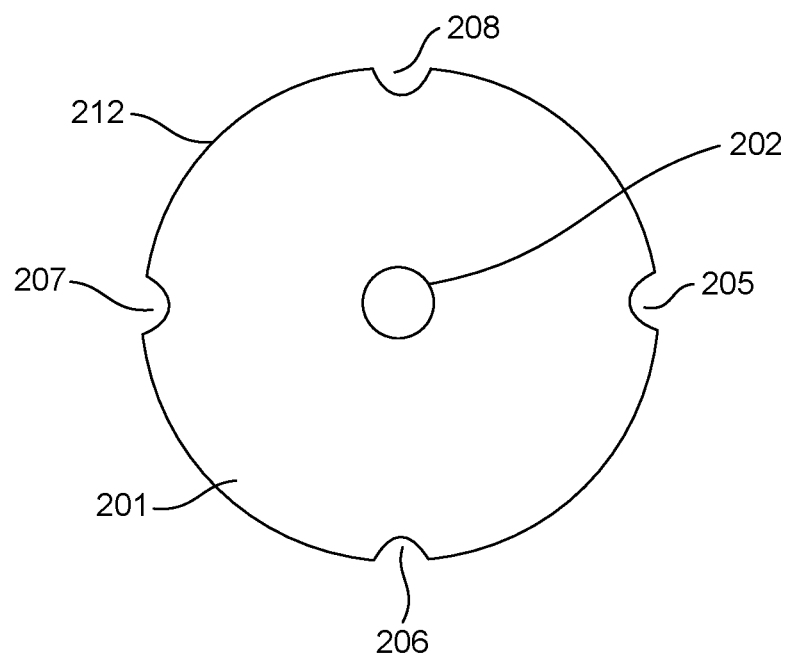
FIG. 2 schematically illustrates a front view of a membrane of an ablation device, according to embodiments.

FIG. 2 schematically illustrates a membrane (200) of an endocardial catheter device described herein. The membrane (200) can be structurally and/or functionally similar to other membranes described herein, and can be used with systems and/or devices as described with reference to such membranes. For example, the membrane (200) can be used with any of the ablation devices as described herein. In some embodiments, the membrane (201) may have an outer edge (212) (e.g., circumference) and an inner portion (202) defining a circular hole (e.g., aperture). As shown in FIG. 2, the outer edge (212) may be approximately circular with arcuate divots, notches, or recesses (205, 206, 207 208). Each divot can be configured as an attachment edge for attachment to a spline of the device, with adjacent divots being attached to adjacent splines of the basket. In other embodiments, adjacent divots can be attached to non-adjacent splines of the basket. Each divot may be glued or heat bonded to a spline. In some embodiments, the inner portion (202) defines an aperture through which the inner shaft (not shown) of the catheter may be received. In some embodiments, the inner shaft may be attached to a hub (such as hub (117) in FIG. 1) and the inner portion (202) of the membrane can be attached (e.g., by glue or thermal bonding) to the hub. In some embodiments, a mean diameter of the aperture of the inner portion (202) can range from between about 1 mm to about 8 mm, including any sub-ranges and values in-between, while the divots or notches can have a mean diameter that can range from between about 1 mm to about 3 mm, including any sub-ranges and values in-between. In some embodiments, a mean diameter of the outer edge can range from between about 6 mm to about 25 mm, including any sub-ranges and values in-between.

Figure 3A:
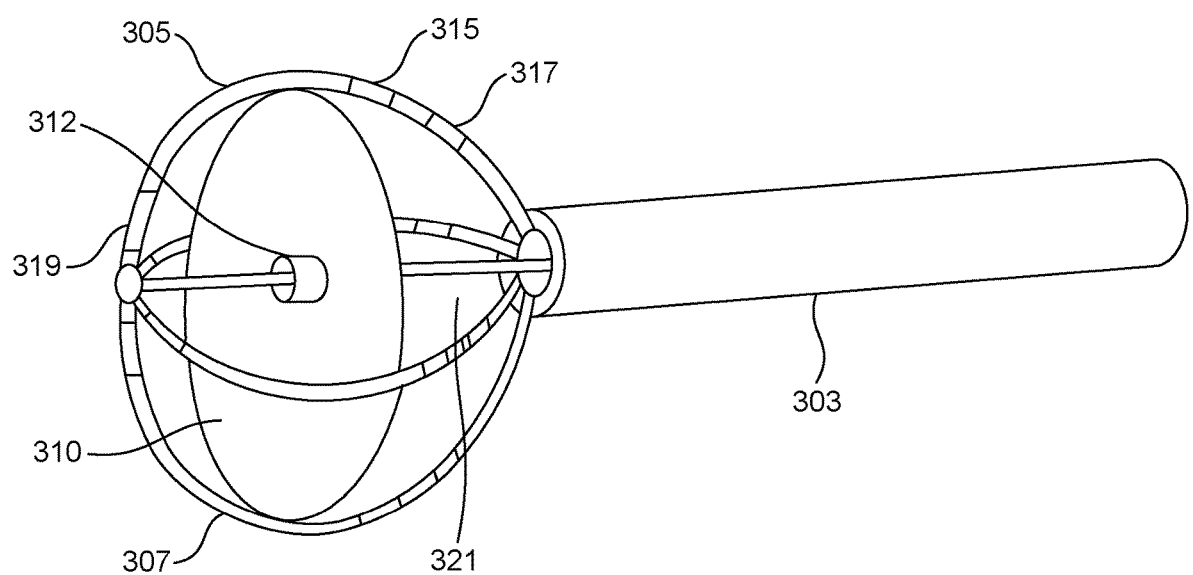
FIGS. 3A and 3B schematically illustrate perspective views of an ablation device in a deployed configuration, according to embodiments.

FIG. 3A schematically illustrates an endocardial catheter device (300) in a deployed configuration, including a multi-spline basket with a deployed (e.g., unfolded) membrane (310). Endocardial catheter device (300) can include components that are structurally and/or functionally similar to other ablation devices described herein (e.g., ablation devices (100, 1110)), and can be used in systems as described with respect to such devices. FIG. 3A illustrates the outer shaft (303) and inner shaft (321). The inner shaft (321) may be in a fully retracted or fully deployed configuration. In this fully deployed configuration, the splines such as (305) and (307) may be bent such that a mid-portion (e.g., mid-point) of each spline is located farther away from the inner shaft (321) as compared to the undeployed configuration. For example, distal electrode (319) and proximal electrodes (315, 317) are disposed on spline (305).

Figure 3B:
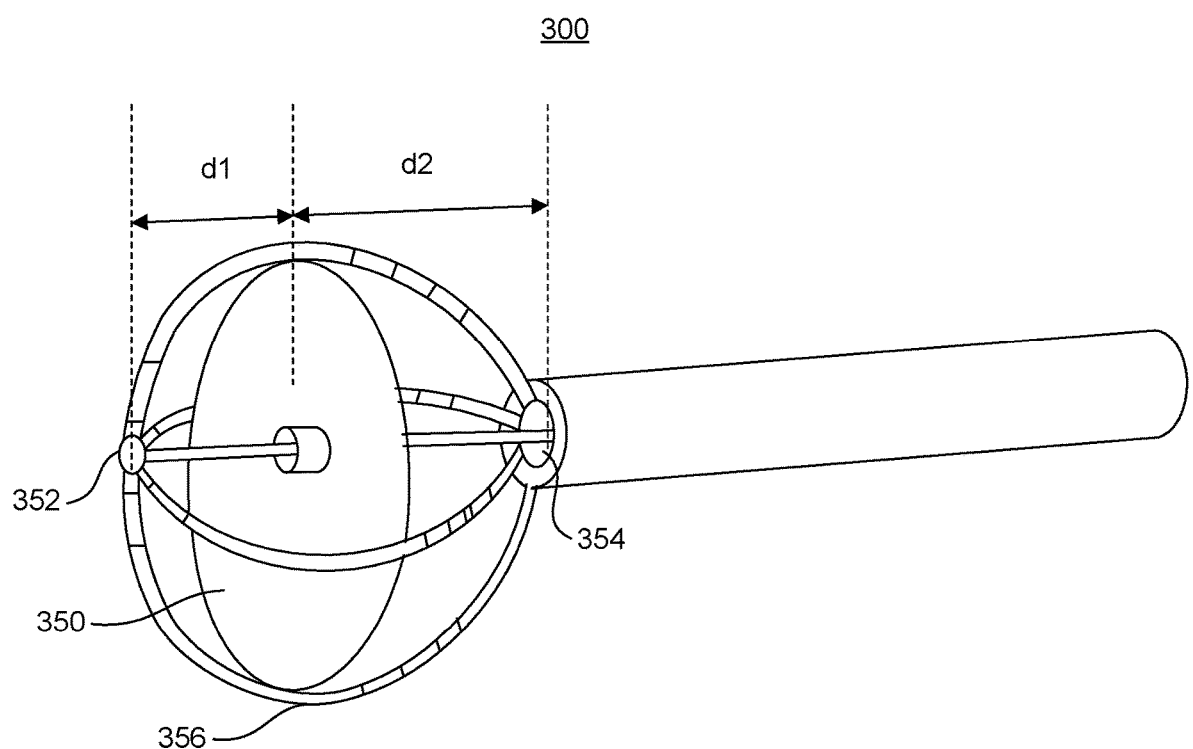

In some embodiments, the membrane (310) may be attached to a hub (312) on the inner shaft (321). Additionally or alternatively, the inner portion of the membrane (310) may be an aperture through which the inner shaft (321) is received. In some embodiments, the outer edge of the membrane can be attached to each of the splines as described herein. Thus, in the fully deployed configuration, and as the splines bend outward, the membrane (310) may be stretched into a flat or planar (e.g., disc-like) shape. In some embodiments, the membrane may be attached to the splines at a longitudinal location on the splines that is at or near the maximal diameter of the basket in the fully deployed configuration, with the distal set of spline electrodes such as (319) being on the distal side of the membrane (310), and the proximal set of spline electrodes such as (315, 317) being on the proximal side of the membrane (310). In some embodiments, the membrane may be attached to the splines at a location on the splines that deviates from the location of the maximal diameter by ±about 30% of d1 or d2, where d1 and d2 are depicted in FIG. 3B. For example, the membrane can be attached to the splines at a location that is closer to the distal end of the splines than the location of the maximal diameter by up to about 30% of d1. Alternatively, the membrane can be attached to the splines at a location that is closer to the proximal end of the splines than the location of the maximal diameter by up to about 30% of d2.

In some embodiments, a longitudinal location of a maximal diameter of the basket can be closer to the distal end of the inner shaft than it is to the distal end of the outer shaft. FIG. 3B schematically illustrates the endocardial catheter device (300) in a deployed configuration, including a multi-spline basket with an unfolded membrane. The membrane (350) can be attached to the splines (356) at the longitudinal location of the splines that coincides with a maximal diameter of the basket. The distances d1 and d2 respectively from the membrane (350) to the distal end of the basket (352) and proximal end of the basket (354) are indicated in FIG. 3B. In some embodiments, distance d1 can be less than distance d2. For example, a set of proximal electrodes may be located so that a point of maximum curvature of a spline (356) (where the membrane is attached) is located closer to the distal end of the basket. In some embodiments, a ratio d1/d2 can be in the range between about 0.1 and about 0.9, including any sub-ranges and values in-between.

Figure 4:
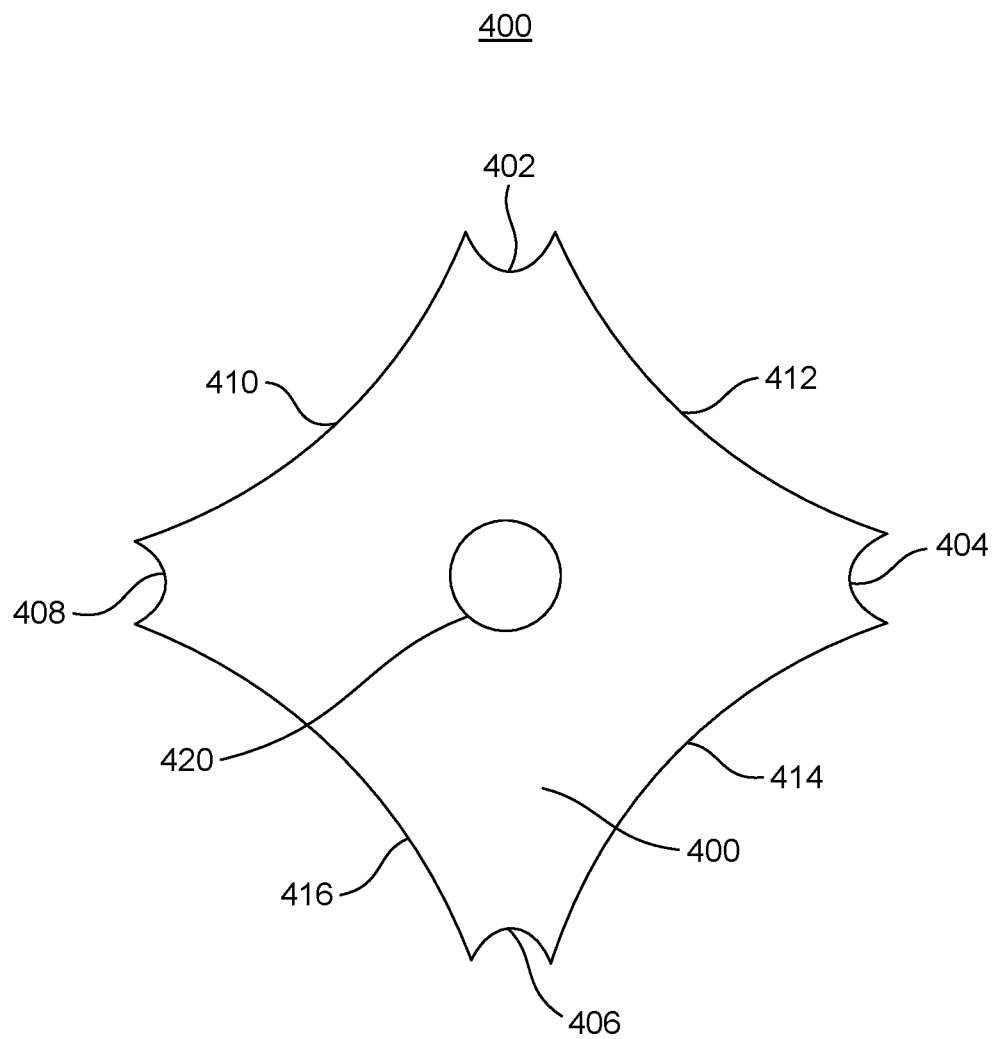
FIG. 4 schematically illustrates a front view of a membrane of an ablation device, according to embodiments.

FIG. 4 schematically illustrates a front view of a membrane (400) of an endocardial catheter device including a multi-spline basket with a foldable membrane. The membrane (400) can be structurally and/or functionally similar to other membranes described herein, and can be used with systems and/or devices as described with reference to such membranes. For example, the membrane (400) can be used with any of the ablation devices as described herein. In FIG. 4, the membrane (400) has an outer edge with relatively longer concave portions (410, 412, 414, 416) with relatively short arcuate divots or notches (402, 404, 406, 408) between adjacent relatively longer concave portions. In some embodiments, the relatively longer portions of the membrane are concave at least along a portion thereof. Additionally or alternatively, the portions (410, 412, 414, 416) may be straight and/or include a set of cuts and/or a set of folds to facilitate deployment (e.g., folding) of the membrane. In some embodiments, one or more portions (410, 412, 414, 416) can be concave while other portions (410, 412, 414, 416) can be straight or have a different shape or curvature.

In some embodiments, the membrane has an inner portion (420) (e.g., aperture, central hole). Each divot may be configured as an attachment edge for attachment to a spline of an ablation device, with adjacent divots being attached to adjacent splines of the ablation device. In some embodiments, each divot or notch may be glued or heat bonded to a spline. In some embodiments, the inner portion (420) defines an aperture through which the inner shaft of the catheter may be received. Additionally or alternatively, the inner shaft may be coupled to a hub and the inner portion (420) of the membrane can be attached (by glue or thermal bonding) to the hub. In some embodiments, a mean diameter of the central hole or inner portion can range from between about 1 mm to about 8 mm, including any sub-ranges and values in-between, while the divots or notches can have a mean diameter that can range from between about 1 mm to about 3 mm, including any sub-ranges and values in-between.

Figure 5:
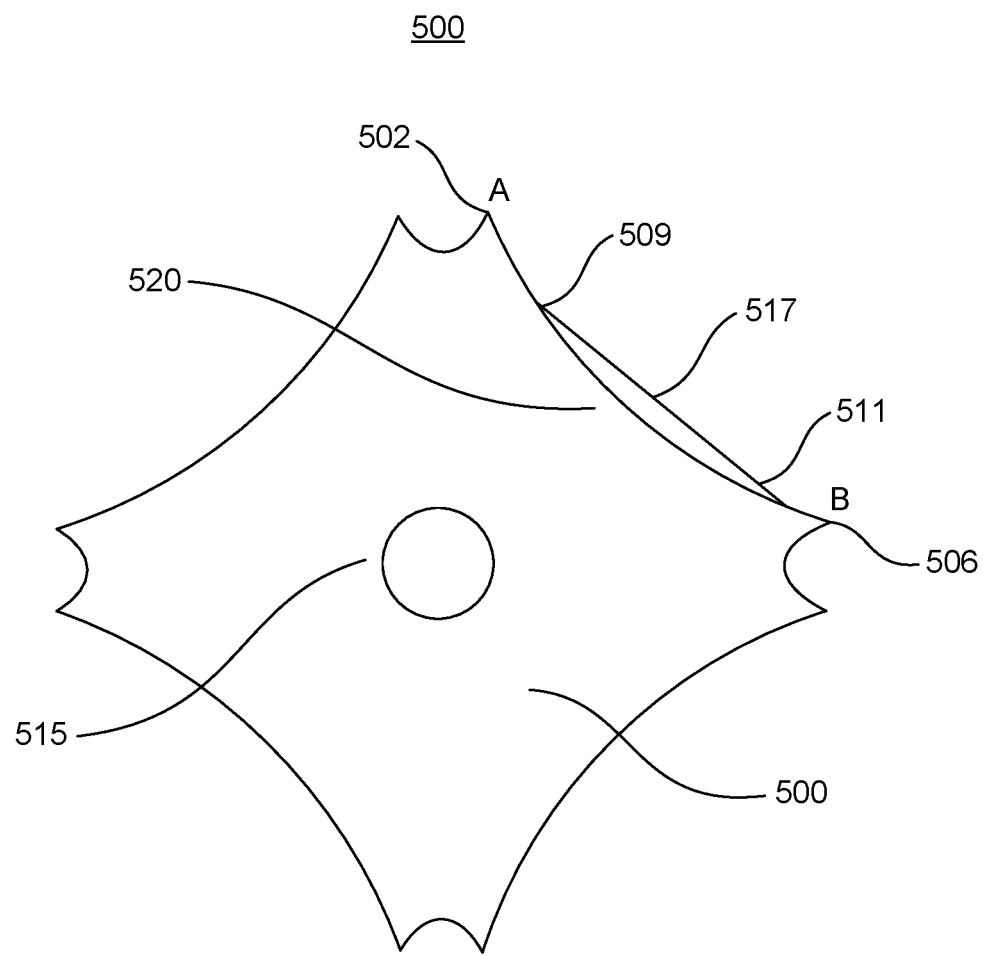
FIG. 5 schematically illustrates a front view of a membrane of an ablation device, according to embodiments.

FIG. 5 schematically illustrates a front view of a membrane (500) of an ablation device, with concavities along an outer edge (e.g., circumference) of the membrane (500) and an inner portion or aperture (515). The membrane (500) can be structurally and/or functionally similar to other membranes described herein (e.g., membrane (400)), and can be used with systems and/or devices as described with reference to such membranes. For example, the membrane (500) can be used with any of the ablation devices as described herein. The outer edge has at least one relatively long concave edge portion (520) with a first end (502) corresponding to point A and a second end (506) corresponding to point B. Two points (509) and (511) are marked along the path from A to B. Straight line (517) is drawn from A to B and has the property that at least a portion of this line (517) is outside the outer edge of the membrane (500); thus, at least a portion of the outer edge (520) is concave.

In some embodiments, the membrane outer edge has one or more concavities or longer concave portions in the sections that are attached between adjacent splines. In such embodiments, the membrane in the undeployed configuration may naturally fold inward without portions extending radially outward between the splines. This can, for example, facilitate smooth passage of the catheter device through a delivery device such as a sheath. In some embodiments, the relatively longer concave portions of the membrane outer edge can be arcuate, with a mean radius of curvature in the range from between about 5 mm to about 50 mm, including any sub-ranges and values in-between.

Figure 6:
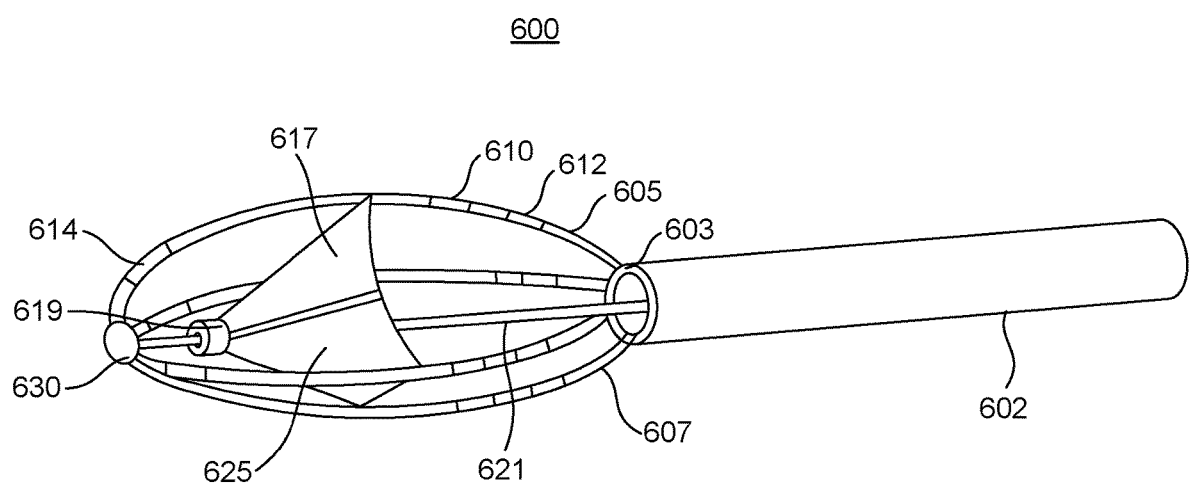
FIG. 6 schematically illustrates a perspective view of an ablation device in an undeployed configuration, according to embodiments.

FIG. 6 provides a schematic illustration of an endocardial catheter device (600) in an undeployed configuration including a membrane with folds and a multi-spline basket. Endocardial catheter device (600) can include components that are structurally and/or functionally similar to other ablation devices described herein (e.g., ablation devices (700, 1110)), and can be used in systems as described with respect to such devices. In some embodiments, the catheter includes an outer shaft (602) with an inner lumen and an inner shaft (621) that extends beyond the distal end (603) of the outer shaft. A plurality of splines (605, 607) may be attached to the inside of the distal end (603) of the outer shaft at their proximal ends, and their distal ends may be attached at device tip (630) to a distal end of the inner shaft (621). In some embodiments, a length of each spline may be longer than the maximum distance by which the distal end of the inner shaft (621) extends beyond the distal end of the outer shaft (602). Thus, the splines may collectively form a basket structure. In some embodiments, the inner shaft (621) can be translated (e.g., retracted, extended) relative to the outer shaft (602) or the outer shaft (602) can be translated relative to the inner shaft (621) via a handle mechanism (not shown).

In some embodiments, each spline may have a set of distal electrodes and a set of proximal electrodes. For example, spline (605) has a distal electrode (614) and two proximal electrodes (610, 612). In some embodiments, a foldable insulating membrane (617) may be attached at its outer edge to the splines. In some embodiments, an inner portion of the membrane (617) may have an aperture through which the inner shaft (621) may be received. In some embodiments, the inner shaft may have a hub (619) to which the inner portion of the membrane (617) may be attached, as shown in FIG. 6. In some embodiments, the hub (619) can, for example, be made of a polymeric material such as Pebax or silicone, while the insulating membrane (617) can be made of a polymeric material such as polyurethane, Pebax, silicone, etc. In an undeployed configuration, membrane (617) may have folds (625) located between adjacent splines where the membrane folds inward relative to the splines.

In the undeployed configuration shown in FIG. 6, the inner shaft (621) may be fully extended beyond the distal end (603) of the outer shaft (602) such that the basket structure formed by the splines has a minimal diameter or cross-section. In some embodiments, the electrodes on the spline can be made of any biocompatible electrical conductor such as stainless steel, gold, platinum-iridium alloys, etc. In some embodiments, the electrodes can range in length from between about 0.5 mm to about 7 mm, including all sub-ranges and values in-between. In some embodiments, the spacing between nearest edges of adjacent proximal electrodes on a given spline (when there are multiple proximal electrodes on a given spline) or between nearest edges of adjacent distal electrodes on a given spline (when there are multiple distal electrodes on a given spline) can range from between about 0.5 mm to about 5 mm, including all sub-ranges and values in-between.

In some embodiments, the arc length of each spline can range from between about 8 mm to about 55 mm, including all sub-ranges and values in-between. In some embodiments, the mean diameter of each spline can range from between about 0.5 mm to about 3 mm, including all sub-ranges and values in-between. In some embodiments, the cross-section of each spline can be approximately elliptical or oval, or the spline cross-section can be circular. In some embodiments, the number of splines comprising the basket can range from about 3 to about 16 splines. In some embodiments, the outer shaft (602) of the catheter can range in outside diameter from between about 5 F (or 5/3 mm) to about 18 F (or 6 mm), including all sub-ranges and values in-between.

Figure 7:
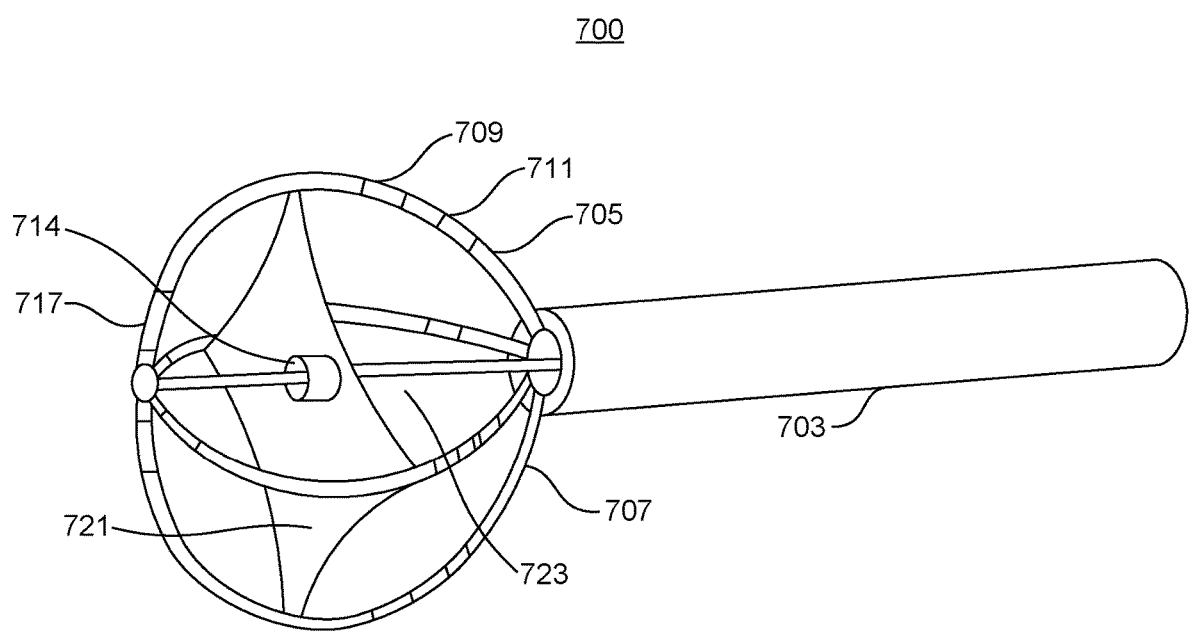
FIG. 7 schematically illustrates a perspective view of an ablation device in a deployed configuration, according to embodiments.

FIG. 7 schematically illustrates an endocardial catheter device (700) (e.g., basket of FIG. 6) in a deployed configuration. Endocardial catheter device (700) can include components that are structurally and/or functionally similar to other ablation devices described herein (e.g., ablation devices (600, 1110)), and can be used in systems as described with respect to such devices. For example, the device (700) including a multi-spline basket with an unfolded membrane (721) with outer edge concavities. In some embodiments, the device (700) includes an outer shaft (703) and inner shaft (723) in a fully retracted or fully deployed configuration. In a fully deployed configuration, the splines (705, 707) may be bent (e.g., bow outward) such that a mid-portion of each spline is located farther away from the inner shaft (723) as compared to the undeployed configuration. In some embodiments, each spline may have a set of distal electrodes and a set of proximal electrodes. For example, distal electrode (717) and proximal electrodes (709, 711) are disposed on spline (705).

In some embodiments, the membrane (721) may be attached to a hub (714) on the inner shaft (723). In some embodiments, the inner portion of the membrane (721) may define an aperture through which the inner shaft (723) may be received. In some embodiments, the outer edge of the membrane (721) may be attached to each of the splines as described herein. Thus, in the fully deployed configuration and as the splines bend outward, the membrane (721) may be stretched (e.g., made taut) to form a flattened or planar shape. In some embodiments, the membrane can be attached to the splines at a longitudinal location on the splines that is at or near the maximal diameter of the basket, with the distal set of spline electrodes (717) being on the distal side of the membrane (721) and the proximal set of spline electrodes (709, 711) being on the proximal side of the membrane (721). As described herein, the longitudinal location of the maximal diameter of the basket can be closer to the distal end of the inner shaft than it is to the distal end of the outer shaft.

Figure 8:
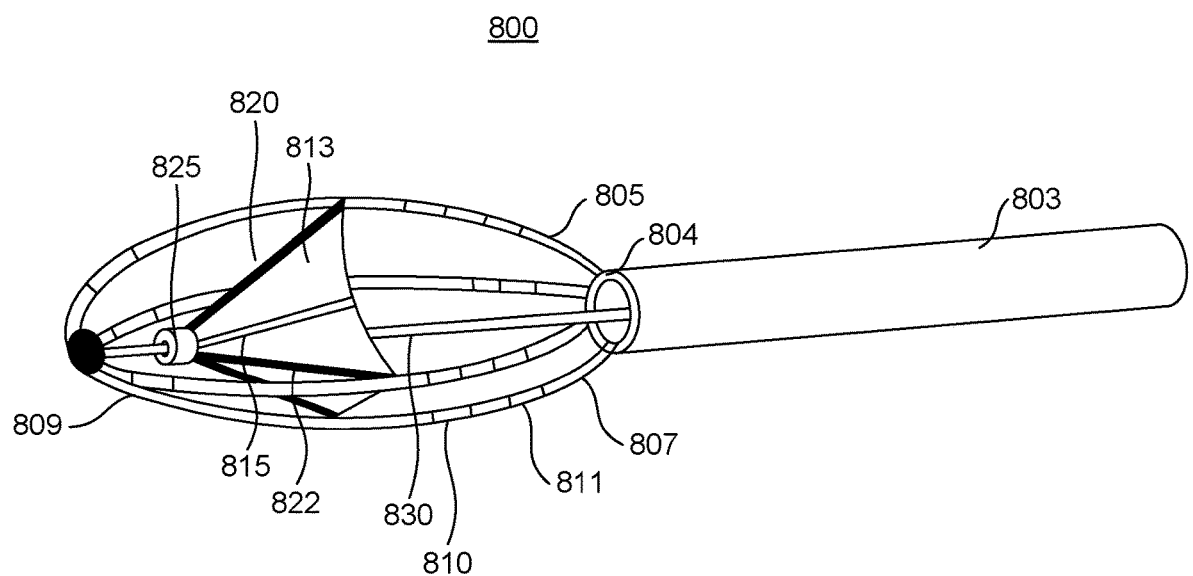
FIG. 8 schematically illustrates a perspective view of an ablation device in an undeployed configuration, according to embodiments.

FIG. 8 provides a schematic illustration of an endocardial catheter device (800) in an undeployed configuration with a multi-spline basket coupled to a foldable membrane with supporting struts. Endocardial catheter device (800) can include components that are structurally and/or functionally similar to other ablation devices described herein, and can be used in systems as described with respect to such devices. For example, the catheter may have an outer shaft (803) with an inner lumen and an inner shaft (830) that extends beyond the distal end (804) of the outer shaft (803). A plurality of splines (805, 807) can be attached to the inside of the distal end (804) of the outer shaft (803) on their proximal ends, and their distal ends can be attached at device tip to the distal end of the inner shaft (830). In some embodiments, the length of each spline may be longer than the maximum distance by which the distal end of the inner shaft (830) extends beyond the distal end of the outer shaft. Thus, the splines may collectively form a basket structure. In some embodiments, the inner shaft (830) can be translated (e.g., retracted, extended) relative to the outer shaft (803) or the outer shaft (803) can be translated relative to the inner shaft (830) via a handle mechanism (not shown).

In some embodiments, each spline may have a set of distal electrodes and a set of proximal electrodes. For example, spline (807) has a distal electrode (809) and two proximal electrodes (810, 811). In some embodiments, a foldable insulating membrane (813) is attached to the splines along a circumference of the membrane (813). In some embodiments, the inner portion of the membrane may have an aperture through which the inner shaft (830) passes. In some embodiments, the inner shaft may have a hub (825) to which an inner portion of the membrane (813) is attached, as shown in FIG. 8. In some embodiments, the hub (825) can, for example, be made of a polymeric material such as, for example, Pebax or silicone, while the insulating membrane (813) can be made of a polymeric material such as, for example, polyurethane, Pebax, silicone, etc.

In some embodiments, in an undeployed configuration, membrane (813) may have folds (815) located between adjacent splines, where the membrane folds inward relative to the splines. In some embodiments, the membrane may include one or more structural supports (820, 822) (e.g., struts) in the form of radial struts running at least partially from an inner portion to the outer edge of the membrane (813) along directions leading to attachment points of the membrane to the splines. The struts (820, 822) can be made of polymeric material such as, for example, Nylon or Kevlar, and can be glued or bonded to the membrane (813) itself. In some embodiments, the struts can add additional structural support to the membrane (813) and can facilitate folding and unfolding of the membrane (813) as the basket is undeployed and deployed, respectively.

In some embodiments, in the undeployed configuration as shown in FIG. 8, the inner shaft can be fully extended beyond the distal end (804) of the outer shaft such that the basket structure formed by the splines has a minimal diameter or cross-section. In some embodiments, the electrodes on the spline can be made of any of a biocompatible electrical conductor such as stainless steel, gold, platinum-iridium alloys, etc. In some embodiments, the electrodes can range in length from between about 0.5 mm to about 7 mm, including all sub-ranges and values in-between. In some embodiments, the spacing between the nearest edges of adjacent proximal electrodes on a given spline (when there are multiple proximal electrodes on a given spline), or between nearest edges of adjacent distal electrodes on a given spline (when there are multiple distal electrodes on a given spline) can range from between about 0.5 mm to about 5 mm, including all sub-ranges and values in-between.

In some embodiments, an arc length of each spline can range from between about 8 mm to about 55 mm, including all sub-ranges and values in-between. In some embodiments, the mean diameter of each spline can range from between about 0.5 mm to about 3 mm, including all sub-ranges and values in-between. In some embodiments, the cross-section of each spline can be approximately elliptical or oval, or the spline cross-section can be circular. In some embodiments, the number of splines comprising the basket can range from between about 3 to about 16 splines. In some embodiments, the outer shaft (803) of the catheter can range in outside diameter from between about 5 F (or 5/3 mm) to about 18 F (or 6 mm).

Figure 9:
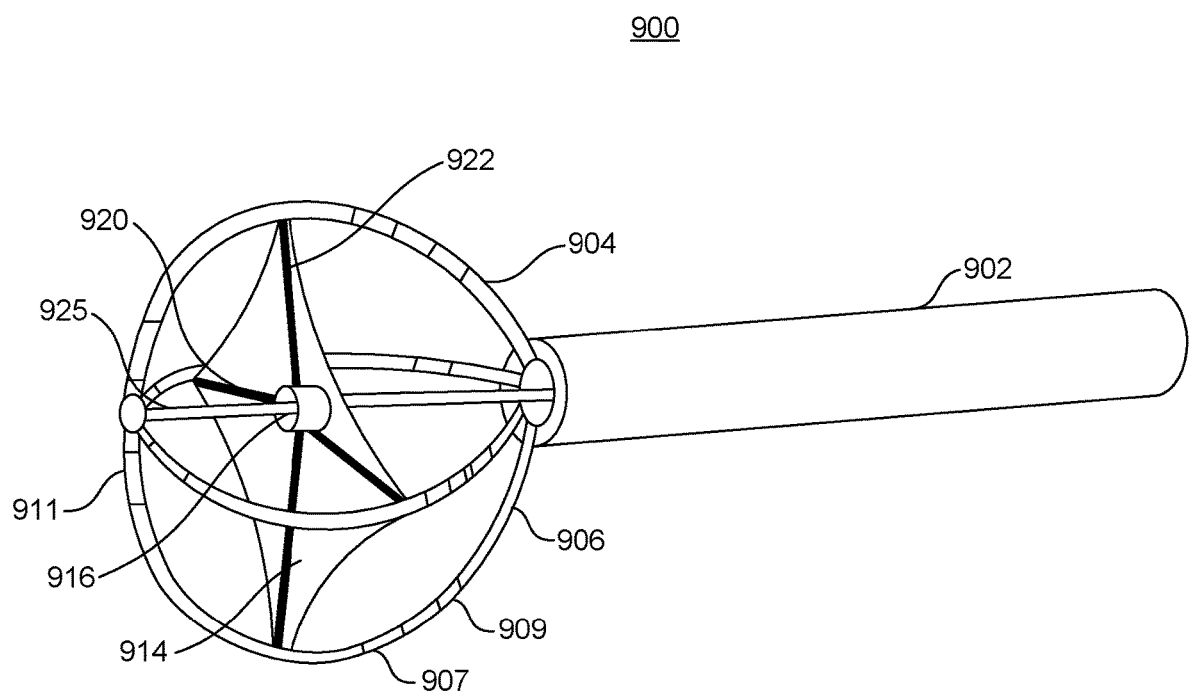
FIG. 9 schematically illustrates a perspective view of an ablation device in a deployed configuration, according to embodiments.

FIG. 9 schematically illustrates an endocardial catheter device (900) in a deployed configuration, including a multi-spline basket with an unfolded membrane (914) with outer edge concavities and supporting struts similar to the device shown in FIG. 8. Endocardial catheter device (900) can include components that are structurally and/or functionally similar to other ablation devices described herein, and can be used in systems as described with respect to such devices. For example, the device (900) includes an outer shaft (902) and an inner shaft (925) in a fully retracted configuration. In a fully deployed configuration, the splines (904, 906) are bent (e.g., bow outward) such that the mid-portion of each spline can be located farther away from the inner shaft (925) as compared to the undeployed configuration. In some embodiments, each spline may have a set of distal electrodes and a set of proximal electrodes. For example, distal electrode (911) and proximal electrodes (907, 909) may be disposed on spline (906).

In some embodiments, the membrane (914) may be attached to a hub (916) on the inner shaft (925). Additionally or alternatively, an inner portion of the membrane (914) may define an aperture through which the inner shaft (925) may be received. In some embodiments, the outer edge of the membrane may be attached to each of the splines as described herein. Thus, in the fully deployed configuration and as the splines bend outward, the membrane (914) may be stretched to a flattened or planar shape. In some embodiments, the membrane may be attached to the splines at a longitudinal location on the splines that is at or near the maximal diameter of the basket with the distal set of spline electrodes (911) being on the distal side of the membrane (914), and the proximal set of spline electrodes (907, 909) being on the proximal side of the membrane (914).

In some embodiments, the membrane (914) with outer edge concavities may have structural supports (920, 922) such as radial struts running at least partially from an inner portion to an outer edge of the membrane (914) along directions leading to attachment points of the membrane to the splines. In some embodiments, struts can be made of polymeric material such as, for example, Nylon or Kevlar and can be glued or bonded to the membrane itself. In some embodiments, the struts can add additional structural support to the membrane and can facilitate folding and unfolding of the membrane as the basket is undeployed and deployed, respectively. In some embodiments, the longitudinal location of the maximal diameter of the basket can be closer to the distal end of the inner shaft than it is to the distal end of the outer shaft.

Figure 10:
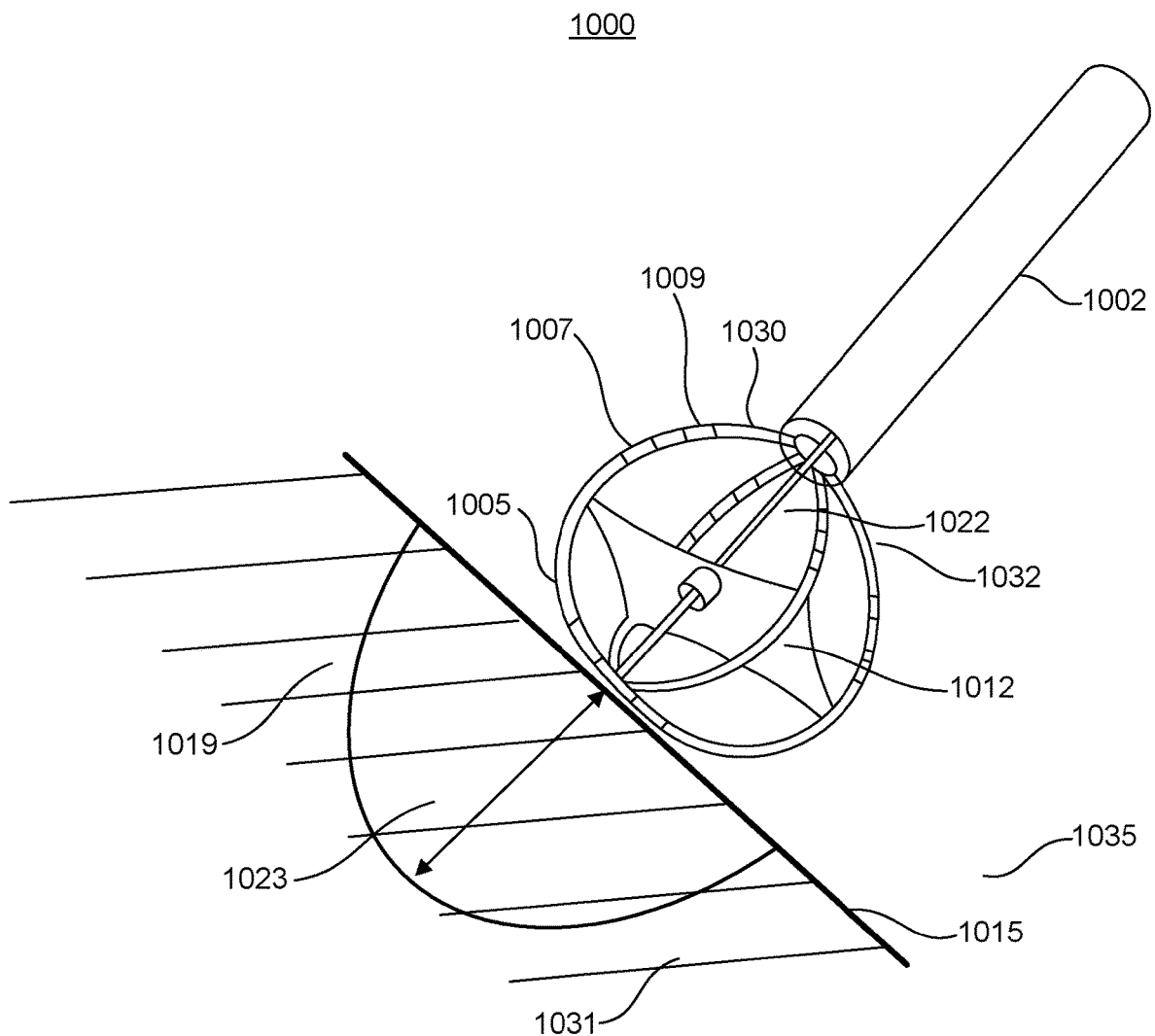
FIG. 10 schematically illustrates a perspective view of an ablation device in a deployed configuration abutting a tissue wall and generating a lesion, according to embodiments.

FIG. 10 schematically illustrates a perspective view of a deployed device (1000) with the deployed distal portion of the device (1000) abutting a tissue wall and depicting the lesion generated in the tissue wall upon ablation delivery along with the lesion depth. Device (1000) can include components that are structurally and/or functionally similar to other ablation devices described herein, and can be used in systems as described with respect to such devices. For example, the device (1000) includes a deployed multi-spline basket with an unfolded membrane (1012) with outer edge concavities as described herein. The catheter device (1000) has an outer shaft (1002), an inner shaft (1022), and a plurality of splines (1030, 1032). In a fully deployed configuration, the splines (1030, 1032) are bent (e.g., bow outward) such that the mid-portion of each spline is located farther away from the inner shaft (1022) as compared to the undeployed configuration. In some embodiments, each spline may have a set of distal electrodes and a set of proximal electrodes. For example, distal electrode (1005) and proximal electrodes (1007, 1009) are disposed on spline (906).

In some embodiments, the membrane (1012) may be attached to a hub on the inner shaft (1022). Additionally or alternatively, the inner portion of the membrane defines an aperture through which the inner shaft (1022) may be received. In some embodiments, the outer edge of the membrane may be attached to each of the splines as described herein. Thus, in a fully deployed configuration and as the splines bend outward, the membrane (1012) may be stretched into a flattened or planar shape. In some embodiments, the membrane may be attached to the splines at a longitudinal location on the splines that is at or near the maximal diameter of the basket with the distal set of spline electrodes (1005) being on the distal side of the membrane (1012), and the proximal set of spline electrodes (1007, 1009) being on the proximal side of the membrane (1012).

In some embodiments, the splines may be deployed in a blood pool (1035) and engaging a tissue wall (1015) on a first side such that a second side (1031) of the tissue wall (1015) comprises solid tissue (e.g., cardiac tissue). In some embodiments, a suitable waveform with a predetermined voltage amplitude (e.g., ranging from about hundreds of volts and up to about 15 kV or more, including all sub-ranges and values in-between) may be applied to subsets of the spline electrodes paired with opposite electrical polarities in order to generate tissue lesions (e.g., waveforms to efficiently generate pulsed field ablation lesions that are suitable for use with such devices, such as those described in International Application Serial Nos. PCT/US2016/057664 and PCT/US2019/031135, incorporated herein by reference), a lesion volume (1023) with a lesion boundary represented by bounding surface (1019) may be generated. In some embodiments, any of the devices described herein can generate tissue lesions with a depth (1023) deep enough to ablate thicker cardiac tissue such as ventricular tissue. In some embodiments, devices having a membrane as described herein may generate lesions having a depth deeper by about 20% or more than a device not having the membrane.

In some embodiments, the ablation lesions generated by pulsed field ablation can be delivered in a range of deployment configurations, including partially or fully deployed. In some embodiments, one or more portions of the catheter device may be deflectable and can be steered or navigated to access a range of cardiac anatomical locations through a deflection control mechanism (e.g., steering knob, plunger/rocker, lever). In some embodiments, the catheter device may be inserted via a delivery device such as a sheath that provides primary access to an anatomical region of interest, with the deflection of the catheter itself providing secondary access for fine control and maneuvering for access a desired target anatomical site. In some variations, one or more of the electrodes of the device may be configured to record diagnostic cardiac electrogram signals when not delivering ablation energy such that local sites can be assessed for electrogram information pre- and post-ablation using the same device.

In some embodiments, the catheter devices described herein may incorporate an electromagnetic tracking sensor for use with an electromagnetic tracking or localization system (e.g., an electronic device (1130)). With the catheter connected to such a system, or to an electroanatomical mapping system, the catheter can be visualized on a display showing its three-dimensional location within a cardiac anatomy. The electrogram recordings from the catheter electrodes can also assist in generating an electroanatomical map that can be a diagnostic reference. Suitable example of such devices are described in International Patent Application No. PCT/US20/61809, titled "Methods, systems, and apparatuses for tracking ablation devices and generating lesion lines," and published as International Patent Application Publication No. WO 2021/108312, the contents of which are hereby incorporated by reference in their entirety.

Methods

Also described here are methods of performing tissue ablation in or near one or more heart chamber(s) using the systems and devices described herein. Generally, one or more catheters may be advanced in a minimally invasive fashion through vasculature to a target location. For example, an ablation device may be advanced through vasculature over a guidewire and through a deflectable sheath. The sheath may be configured for deflection and aid in guiding a focal ablation catheter through vasculature and one or more predetermined targets (e.g., pulmonary vein ostia or other atrial or ventricular locations). A dilator may be advanced over a guidewire and configured for creating and dilating a transseptal opening during and/or prior to use. The methods described here include introducing and disposing an ablation device (e.g., ablation device (1110) or any other ablation devices described herein) near or in contact with a region of the heart. In some embodiments, a cardiac stimulator (e.g., cardiac stimulator (1128)) may be used to deliver a pacing signal to the heart, or measurement device may be used to measure cardiac activity. A pulse waveform may be delivered by one or more electrodes of the ablation device to ablate tissue. In some embodiments, ablation energy may be delivered in synchrony with cardiac pacing. In some embodiments, the voltage pulse waveforms described herein may be applied during a refractory period of the cardiac cycle so as to avoid disruption of the sinus rhythm of the heart.

Figure 12:
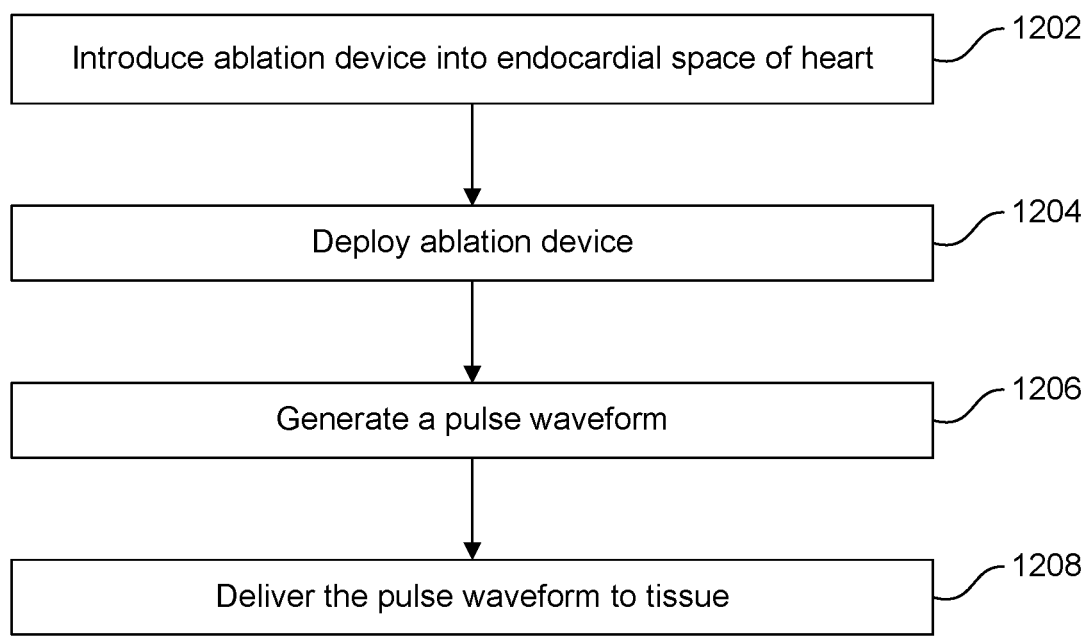
FIG. 12 illustrates a method for tissue ablation, according to embodiments.

FIG. 12 is a method (1200) for one embodiment of a tissue ablation process. In some embodiments, the voltage pulse waveforms described herein may be applied during a refractory period of the cardiac cycle so as to avoid disruption of the sinus rhythm of the heart. The method (1200) includes introduction of a device (e.g., ablation device (1110) or any other ablation devices described herein) into an endocardial space of a heart, at (1202). For example, the device may be inserted through a delivery device such as a deflectable sheath and navigated into an anatomical region of interest. In some embodiments, the electrodes of the ablation device can be disposed near or adjacent to an endocardial surface of the heart. In some embodiments, one or more portions of the device may be deflected to fine-tune the location and placement of the distal portion of the device. The ablation device can be deployed, e.g., as described with respect to example embodiments herein, at (1204). For example, the device may be deployed so as to be apposed to tissue before a pulsed field ablation waveform is applied to tissue using the catheter electrodes.

A pulse waveform may be generated, at (1206). Various bipolar pairing arrangements of subsets of the distal and proximal electrodes respectively can be implemented for ablation delivery and lesion generation. For example, a voltage pulse waveform may be applied in a refractory time window. In some embodiments, the pulse waveform may be generated with a time offset with respect to the indication of a pacing signal. For example, the start of a refractory time window may be offset from the pacing signal by a time offset. The voltage pulse waveform(s) may be applied over a series of heartbeats over corresponding common refractory time windows. In alternate embodiments, the ablation pulse waveform can be delivered without a pacing signal, e.g., asynchronously delivered. The generated pulse waveform may be delivered to tissue, at (1208). In some embodiments, the pulse waveform may be delivered to tissue a heart of a patient via one or more splines of a set of splines of an ablation device. In other embodiments, voltage pulse waveforms as described herein may be selectively delivered to electrode subsets such as anode-cathode subsets for ablation. For example, first and second electrodes of a group of electrodes may be configured to have opposite polarities. These steps may be repeated for a desired number of tissue sites for ablation. For example, after completion of lesion delivery to a first target location, the device may be navigated (using one or more of catheter or sheath deflection) to a second anatomical location for ablation delivery at the second location. The device deployment may be adjusted as needed. In some embodiments, a more complete deployment can generate relatively deeper lesions if the catheter basket orientation with respect to the local tissue wall is at 45 degrees or less relative to the local surface normal at the endocardial surface. The process of ablation delivery can be repeated for multiple target sites, including the generation of continuous lines of ablated tissue.

The apparatus and methods disclosed here can provide for the efficient generation of deep cardiac lesions with pulsed field ablation waveforms. While specific device embodiments are described herein for exemplary purposes, it should be apparent that other device embodiments can also be implemented as convenient as determined by one skilled in the art and according to the disclosures provided herein. For example, departures and variations such as numbers of splines, number of electrodes, and so on, or a variety of focal ablation devices, etc. can be built and deployed according to the teachings herein without departing from the scope of this invention.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). The terms "about" and "approximately" may be used interchangeably.

As used herein, the terms "set" and/or "subset" of components (e.g., electrodes) generally refer to a single one of those components or a plurality of those components.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Field Programmable Gate Arrays (FPGAs), Read-Only Memory (ROM) and Random-Access Memory (RAM) devices. Other embodiments described herein relate to a computer program product, which may include, for example, the instructions and/or computer code disclosed herein.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, Java®, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. An endocardial catheter comprising:
an outer shaft having a proximal end and an opposite distal end, and an outer shaft lumen extending through the proximal and distal ends;
an inner shaft slidably disposed within the outer shaft lumen, the inner shaft having a proximal portion and an opposite distal end, the inner shaft sized to extend beyond the distal end of the outer shaft, wherein the spline assembly can be transitioned between an undeployed configuration and a fully deployed configuration by causing relative axial movement between the inner shaft and the outer shaft, and wherein the spline assembly has a maximum diameter in a fully deployed configuration;
a spline assembly comprising a plurality of flexible splines each having a spline proximal end attached to the distal end of the outer shaft, an opposite spline distal end attached to the distal end of the inner shaft, and a plurality of electrodes, wherein the plurality of electrodes on each spline includes a proximal spline electrode and a distal spline electrode, wherein the plurality of splines collectively define an interior space of the spline assembly; and
a foldable membrane disposed within the interior space of the spline assembly, the foldable membrane having an outer edge portion attached to one or more of the splines at a longitudinal location between the proximal spline electrode and the distal spline electrode disposed on each of the one or more splines;
wherein each of the splines has a curved shape when the spline assembly is in the deployed configuration, and wherein the foldable membrane is attached to the one or more splines at a point of maximum curvature thereof, and wherein the point of maximum curvature is located closer to the distal end of each spline than to the proximal end thereof.

2. The endocardial catheter of claim 1, wherein the foldable membrane is formed of an electrically insulative material.

3. The endocardial catheter of claim 1, wherein the spline assembly has a minimum diameter in the undeployed configuration.

4. The endocardial catheter of claim 3, wherein the proximal spline electrodes of the plurality of splines collectively define a proximal spline electrode set, and wherein the distal spline electrodes of the plurality of splines collectively define a distal spline electrode set.

5. The endocardial catheter of claim 4, wherein the outer edge portion of the foldable membrane is attached to the one or more splines at a longitudinal location thereof corresponding to the maximum diameter of the spline assembly in the fully deployed configuration.

6. The endocardial catheter of claim 4, wherein the foldable membrane assumes a circular shape when the spline assembly is in the deployed configuration.

7. The endocardial catheter of claim 6, wherein the outer edge portion of the foldable membrane has a plurality of arcuate notches at locations corresponding to points of attachment of the foldable membrane to the one or more splines.

8. The endocardial catheter of claim 4, wherein the outer edge portion of the foldable membrane has a plurality of concave portions when the spline assembly is in the deployed configuration.

9. The endocardial catheter of claim 4, wherein the foldable membrane includes a plurality of folds, wherein a respective one of the folds is located between adjacent splines of the spline assembly.

10. The endocardial catheter of claim 4, wherein the foldable membrane includes an aperture, and wherein the inner shaft extends through the aperture.

11. The endocardial catheter of claim 10, wherein the inner shaft includes a hub, and an inner edge of the aperture of the foldable membrane is attached to the hub.

12. The endocardial catheter of claim 11, further comprising a plurality of radial struts coupled to the foldable membrane configured to facilitate folding and unfolding of the foldable membrane as the spline assembly transitions between the deployed and undeployed configuration.

13. A system for focal pulsed field ablation of cardiac tissue, the system comprising:
an endocardial catheter comprising:
an outer shaft having a proximal end and an opposite distal end, and an outer shaft lumen extending through the proximal and distal ends;
an inner shaft slidably disposed within the outer shaft lumen, the inner shaft having a proximal portion and an opposite distal end, the inner shaft sized to extend beyond the distal end of the outer shaft, wherein the spline assembly can be transitioned between an undeployed configuration and a deployed configuration by causing relative axial movement between the inner shaft and the outer shaft;
a spline assembly comprising a plurality of flexible splines each having a spline proximal end attached to the distal end of the outer shaft, an opposite spline distal end attached to the distal end of the inner shaft, and a plurality of electrodes, wherein the plurality of splines collectively define an interior space of the spline assembly; and
a foldable membrane disposed within the interior space of the spline assembly, the foldable membrane having an outer edge portion attached to one or more of the splines, wherein the outer edge portion of the foldable membrane has a plurality of concave portions when the spline assembly is in the deployed configuration; and
a signal generator configured to generate pulsed waveforms and deliver the pulsed waveforms to the plurality of electrodes.

14. The system of claim 13, wherein the plurality of electrodes on each spline includes a proximal spline electrode and a distal spline electrode, and wherein the proximal spline electrodes of the plurality of splines collectively define a proximal spline electrode set, and wherein the distal spline electrodes of the plurality of splines collectively define a distal spline electrode set.

15. The system of claim 13, wherein the outer edge portion of the foldable membrane is attached to the one or more splines at a longitudinal location thereof corresponding to a maximum diameter of the spline assembly in a fully deployed configuration.

16. An endocardial catheter comprising:
an outer shaft having an outer shaft distal end;
an inner shaft disposed within the outer shaft and including an inner shaft distal end, the inner shaft sized to extend beyond the distal end of the outer shaft, wherein the spline assembly can be transitioned between an undeployed configuration and a fully deployed configuration by causing relative axial movement between the inner shaft and the outer shaft, and wherein the spline assembly has a maximum diameter in a fully deployed configuration;
an expandable and collapsible spline assembly including a plurality of splines each connected to the outer shaft distal end and the inner shaft distal end, each spline further including a plurality of electrodes including a proximal electrode and a distal electrode; and
a foldable membrane comprising a polymeric material attached to one or more of the plurality of splines at an attachment location between the proximal and distal electrode disposed thereon, wherein the foldable membrane assumes a circular shape when the spline assembly is in the deployed configuration.

17. The endocardial catheter of claim 16, wherein the attachment location corresponds to a maximum diameter of the spline assembly in a fully deployed configuration.

* * * * *